United States Patent [19]

Lund et al.

[11] 4,355,754

[45] Oct. 26, 1982

[54] STRUCTURAL MEMBERS COMPRISED OF COMPOSITE WOOD MATERIAL AND HAVING ZONES OF DIVERSE DENSITY

[75] Inventors: Anders E. Lund, Houghton; Gordon P. Krueger, Hancock, both of Mich.

[73] Assignee: Board of Control of Michigan Technological University, Houghton, Mich.

[21] Appl. No.: 264,222

[22] Filed: May 18, 1981

[51] Int. Cl.$^3$ .......................... E01B 21/04; B32B 9/04

[52] U.S. Cl. ........................................ 238/83; 428/63; 428/113; 428/171; 428/194; 428/218; 428/326; 428/170; 428/425.1; 428/528; 428/529; 428/537; 156/62.2; 156/283; 156/284; 156/296; 52/720; 52/721; 256/13.1; 40/607

[58] Field of Search ..................... 428/425.1, 528, 218, 428/529, 215, 537, 326, 170, 171, 194, 63, 113; 156/62.2, 283, 284, 296; 238/36, 83; 404/9, 10; 52/720, 721; 256/13.1

[56] References Cited

U.S. PATENT DOCUMENTS

| | | | |
|---|---|---|---|
| 2,139,880 | 12/1938 | Colucci | 428/535 |
| 2,315,967 | 4/1943 | Knowlton | 428/60 |
| 2,509,642 | 5/1950 | Horsak | 428/332 |
| 2,729,584 | 1/1956 | Foster | 156/299 |
| 3,919,017 | 11/1975 | Shoemaker et al. | 428/425.1 |
| 4,105,159 | 8/1978 | Brown | 428/528 |
| 4,241,133 | 12/1980 | Lund et al. | 428/425.1 |
| 4,286,753 | 9/1981 | Lee | 428/529 |

FOREIGN PATENT DOCUMENTS

| | | | |
|---|---|---|---|
| 597941 | 5/1960 | Canada . | |
| 644034 | 10/1950 | United Kingdom | 156/242 |

*Primary Examiner*—P. Ives

[57] ABSTRACT

The disclosed invention includes an improved construction of structural members such as railroad crossties, highway spin posts and highway guard posts and to construction of said members from composite wood material including elongated wood flakes and to a method for making such improved structures.

35 Claims, 11 Drawing Figures

STRUCTURAL MEMBERS COMPRISED OF COMPOSITE WOOD MATERIAL AND HAVING ZONES OF DIVERSE DENSITY

FIELD OF THE INVENTION

The present invention relates to the construction of structural members comprised of composite wood material and adapted for use as railroad crossties, guard posts, sign posts and the like.

Attention is directed to the related U.S. patent application Ser. No. 026,297, filed Apr. 2, 1979, by Lund et al. and titled "Elongated Structural Members Comprised of Composite Wood Material"; and the Lund et al. U.S. Pat. No. 4,241,133, issued Dec. 23, 1980, and titled "Structural Members Of Composite Wood Material And Process for Making Same", both the patent application and the patent referred to above being assigned to the assignee of the present invention.

BACKGROUND PRIOR ART

Various types of structural members, such as railroad crossties, highway sign posts, highway guard posts and other similar structural members are commonly made from solid wood impregnated with a preservative. Continuing increase in demand for wood structural members, increasing production costs, limited supplies of suitable wood species and in the sizes required, and competition for the wood for the other products has caused a growing need for low cost suitable materials from which structural members such as railroad ties, sign posts and guard posts can be made.

Accordingly, attempts have been made to construct such structural members from composite materials. See for example, U.S. Pat. No. 4,105,159 issued Aug. 8, 1978 to Brown.

Attention is also directed to the Waters et al. U.S. Pat. No. 3,515,347; the Hanff No. 3,062,450; the Groff U.S. Pat. No. 3,289,940; and the Langford U.S. pat. No. 1,320,873.

Attention is also directed to the Kilbourne U.S. Pat. No. 847,783; the Baivier U.S. Pat. No. 839,702; the Collins et al. U.S. Pat. No. 3,908,902; and the Hamilton U.S. Pat. No. 3,598,312.

One of the desired characteristics of a railroad crosstie is that the crosstie be wear resistant, particularly in those areas of the tie where the rails rest on the crossties. The force of the rails against the crossties subjects those areas of the crossties to substantial wear and to substantial compressive force. Accordingly, it is desirable that the crossties have substantial resistance to compressive force particularly in those areas supporting the ties, and further that the crossties be particularly resistive to wear in those areas. Examples of prior art attempts to provide increased compressive strength and wear resistance to the crossties in the tie supporting areas are illustrated in the German Pat. No. 693,710; German Pat. No. 531,161; the McClung U.S. Pat. No. 3,826,423; the Pennino U.S. Pat. No. 3,544,006; the Borup et al. U.S. Pat. No. 3,484,043; the Pennino et al. U.S. Pat. No. 3,358,925; and the Graham et al. U.S. Pat. No. 2,014,892.

Attention is also directed to French Pat. No. 856,804; French Pat. No. 690,361; Italian Pat. No. 424,089; and Pennino U.S. Pat. No. 3,558,049.

Attention is also directed to the Roemisch U.S. Pat. No. 3,355,998; the Ryan U.S. Pat. No. 4,123,183; the Roden U.S. Pat. No. 4,078,867; and the Druin et al. U.S. Pat. No. 3,853,418.

SUMMARY OF THE INVENTION

The invention relates to an improved construction of structural members such as railroad crossties, highway sign posts and highway guard posts and to construction of such members from composite wood material including aligned elongated wood flakes and to a method for making such improved structures.

One of the features of the invention is that it provides for the construction of structural members such as railroad crossties, guard posts and sign posts from wood flakes rather than from the large solid wood beams otherwise necessary.

Another of the features of the invention is that it provides such structural members which have strength and wear resistance at least as great as solid wood members.

Another feature of the invention is that the wood flakes which form the structural members constructed in accordance with the invention can be arranged so as to provide improved strength or wear properties in various portions of the structural members. Additionally, the structural members can be formed with differing cross sectional configurations and with portions constructed of densified or less dense regions so that improved properties of the structural members can be achieved.

Various features and advantages of the invention are set forth in the following description, in the claims, and in the drawings.

Figure 1:
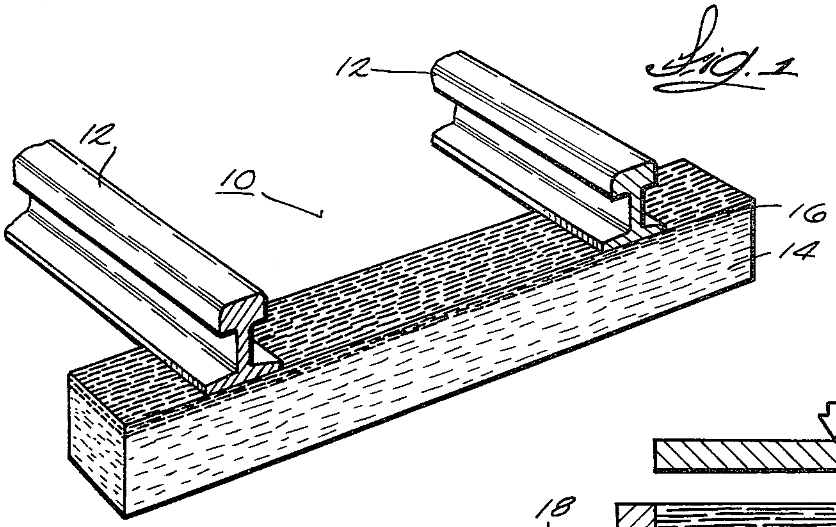
FIG. 1 is a perspective view of a structural member embodying the invention, that structural member comprising a railroad crosstie shown as supporting rails.

Before describing various embodiments of the invention in detail, it is to be understood that the invention is not limited in its application to the details of construction and to the arrangements set forth in the following description or illustrated in the drawings. The invention is capable of further embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an elongated structural member 10 which could be used, for example, as a railroad crosstie to support a pair of spaced rails 12. Referring to FIG. 1, the elongated structural member 10 shown there is comprised of composite wood material including elongated wood flakes mixed with a binder and compressed as will be described more fully hereinafter. Generally, the elongated structural member 10 includes a body portion 14 comprising a majority of the structural member and supporting an upper surface portion 16 which is integrally joined to the body portion 14 but which has a modified construction such that the structural properties of the surface portion 16 are different from the structural properties of the body portion 14.

Figure 2:
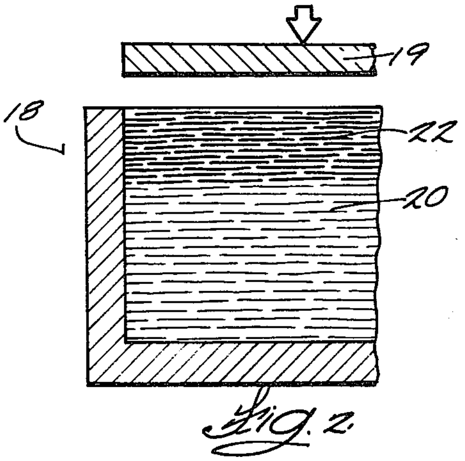
FIG. 2 is a partial side elevation view of a loosely felted mat of wood flakes which are supported in a press cavity and which are to be compressed to form the product illustrated in FIG. 1.
Figure 1A:
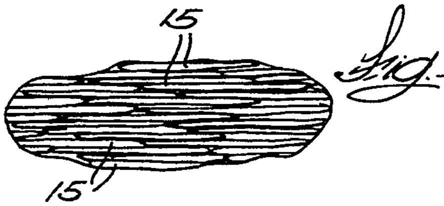
FIG. 1A is an enlarged cross section view of a portion of the crosstie shown in FIG. 1 and showing the flake orientation.

More particularly, the body portion 14 is comprised of composite wood flakes 15 (FIG. 1A) intermixed with a suitable binder material and compressed in a press 18 shown in FIG. 2. Generally, the body portion 14 is formed by constructing a loosely felted thick mat 20 of wood flakes 15 as shown in FIG. 2, the wood flakes having been mixed with a binder material. The felted mat 20 is formed by dispersing the generally planar wood flakes with the planes of the flakes being generally parallel to the upper and lower surfaces of the mat 20 and with substantially all of the flakes being aligned such that the longitudinal axes of the flakes are mutually parallel and parallel to the longitudinal axis of the crosstie to be formed. In the preferred form of the invvention, at least 90% of the wood flakes are to be aligned so as to be parallel to the longitudinal axis of the member being formed. The flakes are also formed such that they have a grain direction extending generally parallel to the longitudinal axis of the flakes such that alignment of the flakes in mutually parallel relation also results in alignment of the wood grain of the flakes with the longitudinal axis of the structural member and thereby forms a structural member having a uniform grain direction.

Wood flakes 15 of the type used in forming the mat 20 are conveniently formed using a conventional ring flaker or a round wood flaker to commutate small logs, branches or rough pulp wood and to form suitably shaped flakes. It is preferred that the wood flakes have a length of from 0.5 to 3.5 inches, a width of 0.1 to 0.5 inches, and a thickness of 0.01 to 0.05 inches. Additionally, it is preferred that the ratio of the average length of the flakes to the average width of the flakes be from about 4:1 to about 10:1. An example of a convenient flake geometry is the use of flakes having a length of approximately 1.6 inches, a thickness of approximately 0.02 inches, and a width of 0.2 to 0.5 inches.

A convenient binder for use in the manufacture of the structural members can comprise phenolformaldehyde or an isocyanate adhesive. In one preferred form of the invention, the binder may comprise an organic polyisocyanate having at least two isocyanate groups per molecule. It has been found that an 8% resin solids composition of such binder, based on oven dry flake weight gives satisfactory strength properties to the resulting elongated structure. To maximize coverage of the flakes, the binder may be applied by spraying droplets of the binder in liquid form onto the flakes.

To preserve the structural members 10 such as railway ties, guard posts or sign posts from decay due to fungi, a suitable fungicide can also be applied to the wood flakes 15 of the composite wood mat 20. The wood flakes may also be treated or mixed with a suitable biocide such as pentachlorophenol, creosote, chromated copper arsenate and ammoniacal copper arsenate.

In the embodiment of the invention in FIG. 1, the second portion of covering layer 16 comprises a layer of densified composite wood material, the densified material layer being intended to act as a high strength wear resistant covering for the body portion 14. If, for example, the elongated structural member 10 is employed as a railroad tie, the covering layer will function to provide a high strength wear resistant support for the rails 12 and is functional to prevent the rails 12 from cutting into the less dense material forming the body portion 14. The densified surface layer 16 also functions to distribute the forces applied by the rails 12 to the less dense body portion 14 of the tie.

In the illustrated embodiment of the invention, this high strength densified layer 16 can be comprised of composite wood material formed primarily of oak flakes whereas the body portion 14 of the structural member can be formed of a softer wood such as aspen or the like.

During formation of the mat illustrated in FIG. 2, and intended to form the structural members shown in FIG. 1, the aspen flakes or other softwood flakes are deposited to form a mat 20 having a thickness of approximately 30 inches, and then the hardwood or oak flakes are deposited on top of this mat portion 22 to form the remainder of the mat such that the mat has a total thickness of approximately 35 inches. As in the case of the aspen flakes, the hardwood flakes are mixed with a suitable binder, such as that described above, and lie in the same orientation as the softwood flakes forming the body portion. In the embodiment illustrated in FIGS. 1 and 2, it is also preferred that the hardwood flakes forming the upper part 22 of the mat be aligned with the flakes of the mat portion 20 in mutually parallel alignment and parallel to the longitudinal axis of the elongated structural member to be formed. The mat formed by the two stacked mat portions 20 and 22 is then compressed by a press member 19 in a suitable press, such as press 18, to cause densification of the mat and curing of the resin binder to thereby form a structure as shown in FIG. 1. Since the hardwood flakes and the softwood flakes are compressed together during the pressing operation, the upper densified layer 16 and the body portion 14 of the crosstie 10 are integrally joined in the same manner that the flakes are integrally joined together by the binder.

In use, the crosstie shown in FIG. 1 is positioned such that the upper densified layer 16 of the crosstie will support the rails 12. This arrangement provides a crosstie 10 which is resistant to cleavage. The crosstie so formed is also wear resistant and not subjected to deformation caused by the force of the rails 12 on localized portions of the tie, and also has a high bending or shear strength. Another of the substantial advantages of the railroad crosstie 10 constructed in the manner described is that whereas conventional crossties are subject to checking, i.e. splitting in the opposite ends of the crosstie, the crosstie formed in the manner as shown in FIGS. 1 and 2 is resistant to such checking.

Figure 3:
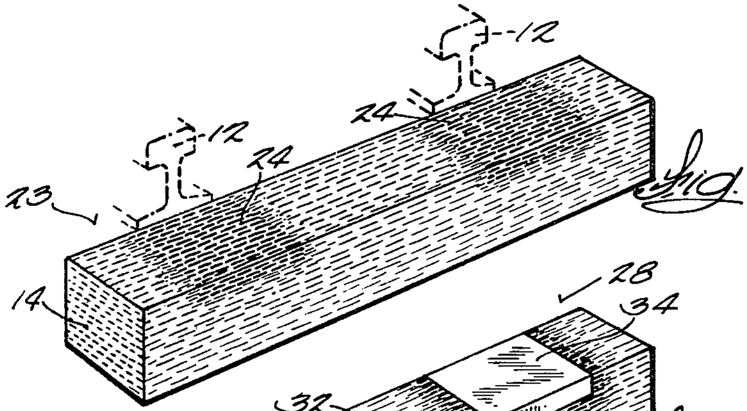
FIG. 3 is a view similar to FIG. 1 and showing an alternative embodiment of the invention.
Figure 4:
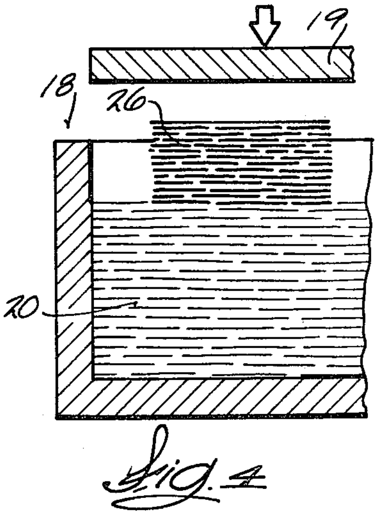
FIG. 4 is a view similar to FIG. 2 and showing a loosely felted mat for use in forming the structure shown in FIG. 3.

FIG. 3 illustrates an alternative embodiment of the railroad tie illustrated in FIG. 1. The railroad tie 23 shown in FIG. 3 is provided with densified surface areas 24 only in those areas where the rails 12 are to be supported. FIG. 4 is a view similar to FIG. 2 and showing a mat 20 of loosely felted flakes deposited in the same manner as in the construction of the mat used in forming the body portion 14 of the tie 10 shown in FIG. 1. The high density areas 24 of the crosstie 23 shown in FIG. 3 are formed by depositing additional quantities 26 of wood flakes on those areas of the mat 20 which will become the rail supporting areas. When the mat illustrated in FIG. 4 is compressed to form the tie shown in FIG. 3, the areas 26 comprising the additional buildup of wood flakes will be further compressed and will form densified surface areas 24. In another similar embodiment, the portion of the mat 26 being built up in the tie supporting areas can be comprised of wood flakes such as oak flakes or other hardwood flakes to thereby further increase the wear resistance of the rail supporting areas 24.

Figure 5:
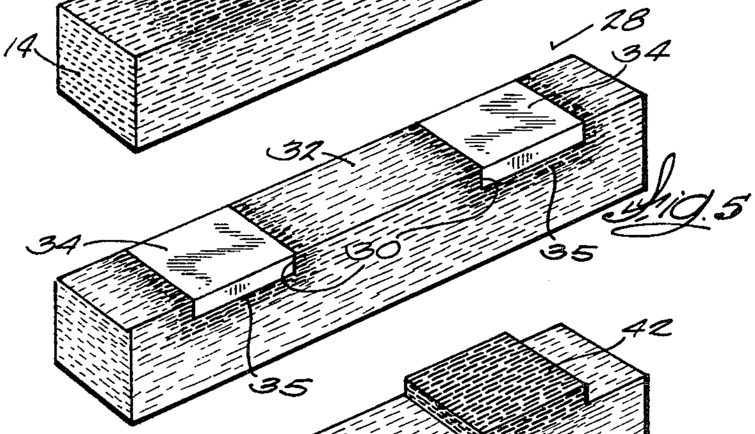
FIG. 5 is a perspective view similar to FIG. 1 and showing another alternative embodiment of the invention.

Another embodiment of the invention is illustrated in FIG. 5 wherein a railroad crosstie 28 is shown as including recesses 30 molded into its upper surface 32, the recesses 30 housing metal tie plates 34 of the type adapted to support rails 12. The metal tie plates 34 are intended to distribute the forces applied to the tie 28 by the rails 12 and to prevent undue wear of the tie which might otherwise be caused by movement of the rails 12 on the tie.

The recesses 30 in the tie illustrated in FIG. 5 could be formed by modifying the configuration of the press member 19 for use in making the tie shown in FIG. 3 so as to include two projections extending downwardly from the lower surface of the movable press member, these projections having a configuration of the tie plate 34. During compression of the mat in a press which includes such projections or male die members, those areas of the crosstie surrounding the die members will be compressed more than the other areas of the tie and will be denser and have an increased hardness and wear resistance. In other forms of the invention, the wood flake mat can also be built up in those areas to further increase the density in the area of the recesses 30 supporting the tie plates 34, or the wood flake material in those areas can be a hardwood such as oak. By providing a densified wood material around the tie plates 34, forces applied by the tie plates 34 to the tie are received by the densified material thereby limiting the wear of the tie and also distributing the forces applied to the tie by the rail and by the tie plates.

One of the advantages of the structure of the crossties illustrated in FIGS. 1, 3 and 5 is that they have a compression strength and a bending strength comparable to or better than that of solid wood crossties. Bending strength of the ties is particularly important where the road bed may be crowned such that the tie is supported in the center but not adequately supported at its opposite ends. Additionally, whereas the ends of the crossties commonly split or check, the composite wood material cross-ties shown in the drawings herein and constructed in the manner described above will not be subjected to such splitting or checking.

Figure 6:
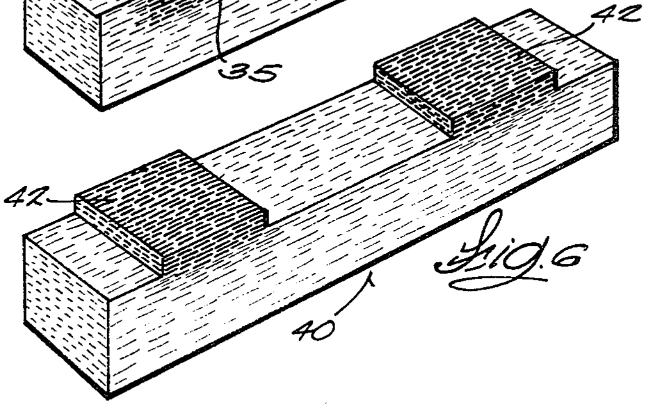
FIG. 6 is a view similar to FIG. 5 and showing a further alternative embodiment of the invention.

FIG. 6 illustrates an alternative embodiment of the crossties shown in FIGS. 1, 3 and 5 and wherein the crosstie 40 includes integral crosstie pads 42 formed on the upper surface of the crosstie 40. The crosstie pads 42 can be formed by depositing additional wood flakes during the formation of the mat 20 on selected portions of the mat 20 and in the same manner shown in FIG. 4 and by forming recesses in the surface of the upper die member of the press. It will be understood that the crosstie pads 42 can be formed either from the wood flakes which are employed to form the body portion of the crosstie or from hardwood flakes if increased hardness and compressive strength are required.

Figure 7:
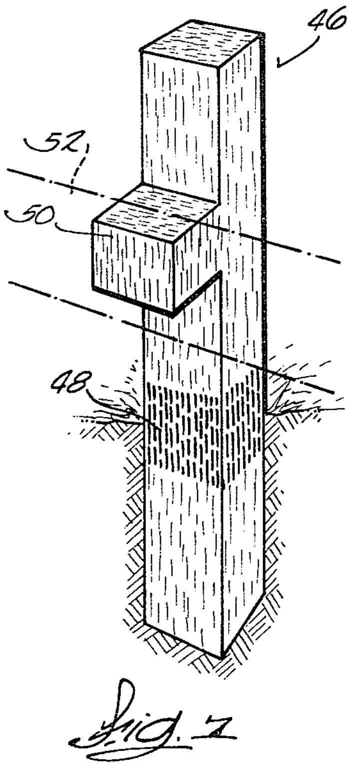
FIG. 7 is a perspective view of a highway guard post embodying the present invention.

Illustrated in FIG. 7 is another embodiment of the present invention, that embodiment including a highway guard post 46 comprised of composite wood material constructed in substantially the manner described above in connection with construction of the elongated structural member and by compressing a loosely felted mat of wood flakes which have been mixed with a binder and with the wood flakes oriented such that they are parallel with the longitudinal or vertical axis of the post. The guard post 46 shown in FIG. 7 also includes a highly densified area 48 intermediate its opposite ends, the highly densified area 48 being intended to be located in the area of the ground line when the post is positioned in the ground to thereby increase the bending and shear strength of the post in that area. By providing a post which has increased density at the ground line, the post will have a greater resistance to impact and will provide increased highway safety.

The post 46 illustrated in FIG. 7 is constructed by compressing a loosely felted mat of wood flakes which have been intermixed with a suitable binder, the loosely felted mat being formed in the same manner as previously described and with the wood flakes in parallel alignment. The densified region 48 of the post is formed by increasing the thickness of the mat in the area which is to form the densified region. This increased thickness can be provided by depositing additional flakes on the upper surface of that portion of the mat or on both the upper and lower surfaces of the mat.

As also illustrated in FIG. 7, the post can also include an attachment block 50 as an integral molded part of the guardrail post. The attachment block 50 is used to provide means for connection of a guardrail 52 to the post. In those cases where the guardrail post 46 is comprised of a wooden beam, a separate attachment block must be nailed or bolted to the post. Using the composite wood material posts of the invention, the attachment block 50 can be conveniently formed as an integral part of the post without significant additional expense. The attachment block is provided by depositing an additional quantity of wood flakes in that area and by constructing a press apparatus to include a die cavity portion complementary to the attachment block 50.

Figure 8:
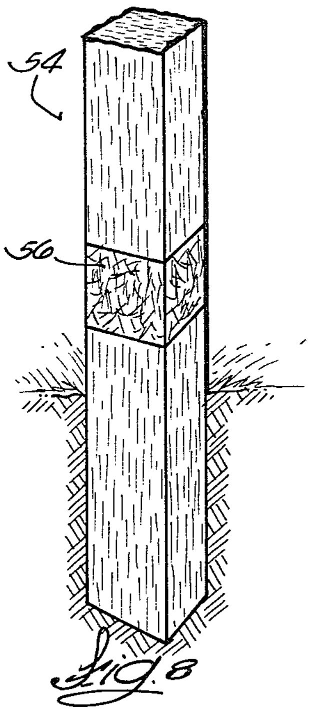
FIGS. 8 and 9 are views similar to FIG. 7 and showing a portion of a highway sign post embodying the invention.

FIG. 8 illustrates another embodiment of the invention and includes a sign post 54 for use in supporting highway signs or the like and including a section 56 intermediate its opposite ends intended to have a substantially decreased shear strength such that the sign post can break away on impact. The sign post 54 is constructed in generally the same manner as has been described above and by forming a loosely felted mat of wood flakes with the wood flakes being disposed in most areas of the mat in horizontal planes and with the flakes aligned in mutually parallel relation and parallel to the longitudinal axis of the post. While most of the post 54 is constructed in this manner, the break-away section 56 is formed by providing a low density of flakes in that area of the mat which will become the low density area 56 of the post 54 and by depositing those flakes in that low density area in a random orientation rather than in parallel alignment. This can be accomplished during the formation of the mat to be compressed to form the post, by depositing fewer wood flakes in that area of the mat which is to become the break away area 56 and by depositing those flakes such that they have a random orientation rather than a mutually parallel orientation.

Figure 9:
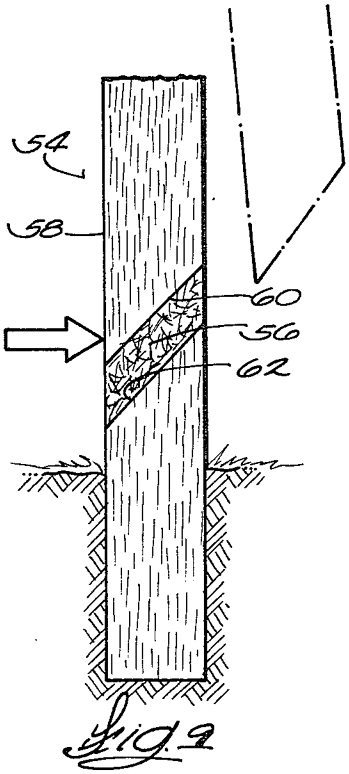

FIG. 9 illustrates an alternative embodiment of the highway sign post 54 shown in FIG. 8 and with the low density random orientation area or region 56 of the post 54 sloping upwardly and rearwardly from the front face or impact face 58 of the post to the rear face. This arrangement results in shear planes 60 and 62 extending through the post which slope upwardly and rearwardly from the impact face. With this construction, impact of an auto with impact face 58 of the post 54 causes the upper end of the post to be deflected upwardly away from the auto as shown in phantom and prevents damage and injury which might be otherwise caused by the sheared post striking the auto.

Figure 10:
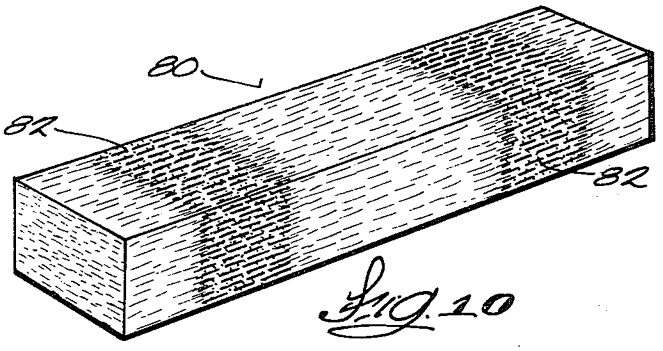
FIG. 10 is a view similar to FIG. 1 and showing a further alternative embodiment of the invention.

FIG. 10 shows a further embodiment of the invention and wherein a railroad crosstie 80 manufactured in accordance with the present invention includes material molded into the rail supporting areas 82 of the composite wood material of the crosstie to thereby provide increased compressive strength, cleavage resistance, hardness, and wear resistance. During the deposit of the wood flakes and formation of a suitable mat of wood flakes, reinforcement fibers can be mixed with that portion of the wood flakes being deposited in those areas of the mat which will become the tie plate areas of the railroad crosstie. Suitable reinforcing fibers which can be mixed with the wood flakes to form this reinforcement can comprise carbon, glass, plastics, film, metal, etc. In a preferred form of the invention, these reinforcement fiber materials are deposited along with the wood flake material and are evenly distributed in the wood flake material. When a loosely felted mat containing these reinforcement fibers is then compressed, the fibers become firmly embedded in the wood flakes and binder and provide reinforcing structure in those areas of the crossties. While in the illustrated embodiment the reinforcing fiber material is included throughout the thickness of the crosstie in the tie plate area, in other embodiments the reinforcing material can be deposited only in the upper portion of the mat.

Various features of the invention are set forth in the following claims.

We claim:

1. An elongated composite wood member having a longitudinal axis and being comprised of composite wood material, said composite wood material member comprising:

a first composite wood material portion including elongated planar wood flakes intermixed with a binder and compressed to form a densified product, said elongated wood flakes each having a longitudinal axis, the grain direction of said wood flakes being aligned parallel with said longitudinal axis of said wood flakes, said wood flakes being aligned with their longitudinal axis parallel to the longitudinal axis of the elongated member, and said planar wood flakes lying in parallel planes, and a second composite wood material portion integrally joined to said first composite wood portion, said second composite wood material portion comprising elongated planar wood flakes intermixed with a binder and compressed to form a densified product, said densified product formed by said second composite wood material portion having a density other than the density of said first portion and having strength properties different from the strength properties of said first portion, said first composite wood portion and said second composite wood portion being formed at the same time and by forming a loosely felted mat comprised of said elongated planar wood flakes intermixed with a binder, said mat including a first portion intended to form said first composite wood material portion and said mat including a second portion intended to form said second composite wood material portion, and by compressing said composite wood material mat in a press to form said first composite wood material portion and said second composite wood material portion.

2. An elongated member as set forth in claim 1 wherein said densified product formed by said second composite wood material has a density greater than the density of said first portion and wherein said elongated wood flakes forming said second composite wood material portion each have a longitudinal axis, and the grain direction of said wood flakes being aligned substantially parallel with the longitudinal axis of said wood flakes, and wherein said wood flakes are aligned with their longitudinal axes parallel to the longitudinal axis of the elongated member.

3. An elongated member as set forth in claim 1 wherein said wood flakes have an average length of about 0.5 inches to about 3.5 inches, an average width of about 0.1 to 0.5 inches, and an average thickness of about 0.01 to about 0.05 inches.

4. An elongated member as set forth in claim 3 wherein said binder comprises an organic polyisocyanate having at least two active isocyanate groups per molecule.

5. A railroad crosstie comprised of composite wood material and including a longitudinal axis, the crosstie including a base portion comprised of a composite wood material including elongated planar wood flakes intermixed with a binder and compressed to form a densified product, said elongated wood flakes each having a longitudinal axis, the grain direction of said wood flakes being parallel with said longitudinal axis of said wood flakes, and said wood flakes being aligned with their longitudinal axes parallel to the longitudinal axis of the crosstie, and said planar wood flakes lying in parallel planes, and a densified rail supporting portion supported by said base portion and adapted to support a rail thereon, said densified rail supporting portion being integrally joined to said base portion, said rail supporting portion comprising elongated planar wood flakes intermixed with a binder and compressed to form a densified product, said densified product forming said rail supporting portion having a density greater than the density of said body portion, and said rail supporting portion being integrally formed with said body portion and being integrally bonded thereto, said base portion and said densified rail supporting portion being formed at the same time and by forming a loosely felted mat of said elongated planar wood flakes intermixed with said binder and said mat including a first mat portion for forming said base portion and said mat including a second portion for forming said densified rail supporting portion end by compressing said mat in a press to form said base portion and said densified rail supporting portion.

6. A railroad crosstie as set forth in claim 5 wherein said wood flakes forming said base portion are comprised of a first wood material and wherein said wood flakes forming said densified rail supporting portion are comprised of a second wood material.

7. A railroad crosstie as set forth in claim 5 wherein said base portion includes an upper layer and wherein said densified rail supporting portion comprises a layer covering said upper layer of said base portion.

8. A railroad crosstie as set forth in claim 5 wherein said densified rail supporting portion includes means defining a recess therein, said recess being adapted to support a tie plate, said material supporting said tie plate and surrounding said tie plate having a density greater than the density of said base portion.

9. A railroad crosstie as set forth in claim 5 wherein said elongated wood flakes forming said densified rail supporting portion each have a longitudinal axis, and the grain direction of said wood flakes is aligned substantially parallel with the longitudinal axis of said wood flakes, and wherein said wood flakes are aligned with their longitudinal axes parallel to the longitudinal axis of the railroad crosstie.

10. A railroad crosstie as set forth in claim 5 wherein said wood flakes have an average length of about 0.5 inches to about 3.5 inches, an average width of about 0.1 to 0.5 inches, and an average thickness of about 0.01 to about 0.05 inches.

11. A railroad crosstie as set forth in claim 5 wherein said binder comprises an organic polyisocyanate having at least two active isocyanate groups per molecule.

12. An elongated structural member including a longitudinal axis and comprising a base portion comprised of a composite wood material including elongated planar wood flakes intermixed with a binder and compressed to form a densified product, said elongated wood flakes each having a longitudinal axis, the grain direction of said wood flakes being aligned parallel with said longitudinal axis of said wood flakes, and said wood flakes being aligned with their longitudinal axes parallel to the longitudinal axis of the elongated structural member, and said planar wood flakes lying in parallel planes, and a densified portion comprising elongated planar wood flakes intermixed with a binder and compressed to form a densified product, said densified product forming said densified portion having a density greater than the density of said body portion and being integrally formed with said body portion and integrally bonded thereto, said base portion and said densified portion being formed at the same time and by forming a loosely felted mat comprised of said elongated planar wood flakes intermixed with a binder, said mat including a first mat portion intended to form said base portion and said mat including a second mat portion intended to form said densified portion and by compressing said composite wood material mat in a press to form said base portion and said densified portion.

13. An elongated structural member as set forth in claim 12 wherein said wood flakes forming said base portion are comprised of a first wood material and wherein said wood flakes forming said densified portion are comprised of a second wood material.

14. An elongated structural member as set forth in claim 12 wherein said base portion includes an upper layer and wherein said densified portion comprises a layer covering said upper layer of said base portion.

15. An elongated structural member as set forth in claim 12 wherein said elongated wood flakes forming said densified portion each have a longitudinal axis, and the grain direction of said wood flakes is aligned parallel with the longitudinal axis of said wood flakes, and wherein said wood flakes are aligned with their longitudinal axes parallel to the longitudinal axis of the elongated structural member.

16. An elongated structural member as set forth in claim 12 wherein said wood flakes have an average length of about 0.5 inches to about 3.5 inches, an average width of about 0.1 to 0.5 inches, and an average thickness of about 0.01 to about 0.05 inches.

17. An elongated structural member as set forth in claim 12 wherein said binder comprises an organic polyisocyanate having at least two active isocyanate groups per molecule.

18. A post adapted to be supported in the ground and including a longitudinal axis, said post comprising a lower end adapted to extend into the ground and an upper end, said upper and lower ends of said post being comprised of composite wood material including elongated wood flakes intermixed with a binder and compressed to form a densified product, said elongated wood flakes each having a longitudinal axis, the grain direction of said wood flakes being aligned substantially parallel with said longitudinal axis of said wood flakes, and said wood flakes being aligned with their longitudinal axes parallel to the longitudinal axis of the post, and a post portion intermediate said upper and lower ends, said intermediate portion having a shear strength which is less than the shear strength of said upper and lower ends, and said intermediate portion being comprised of wood particles intermixed with a binder and compressed to form a composite product, and wherein said wood particles are in random orientation, said upper and lower post portions and said intermediate post portion being formed at the same time and by forming a loosely felted mat comprised of said elongated planar wood flakes intermixed with a binder, said mat including portions having aligned wood flakes and intended to form said upper and lower post portions and said mat including an intermediate portion comprised of randomly oriented flakes and intended to form said intermediate post portion, and by compressing said composite wood material mat in a press to form said upper and lower post ends and said intermediate post portion.

19. A post as set forth in claim 18 wherein said intermediate portion has a density less than the density of said upper and said lower ends.

20. A post as set forth in claim 18 wherein said post includes an impact face and wherein the intermediate portion defines a shear area which slopes upwardly and rearwardly from said impact face.

21. A post as set forth in claim 18 wherein said wood flakes have an average length of about 0.5 inches to about 3.5 inches, an average width of about 0.1 to 0.5 inches, and an average thickness of about 0.01 to about 0.05 inches.

22. A post as set forth in claim 21 wherein said binder comprises an organic polyisocyanate having at least two active isocyanate groups per molecule.

23. A post adapted to be supported in the ground and including a longitudinal axis, said post comprising a lower end adapted to extend into the ground and an upper end, said upper and lower ends of said post being comprised of composite wood material including elongated wood flakes intermixed with a binder and compressed to form a densified product, said elongated wood flakes each having a longitudinal axis, the grain direction of said wood flakes being aligned substantially parallel with said longitudinal axis of said wood flakes, and said wood flakes being aligned with their longitudinal axes parallel to the longitudinal axis of the post, and a densified post portion intermediate said upper and lower ends, and intended to be at the ground line when said post is set in the ground, said densified intermediate portion being integrally joined to said upper and lower ends and having a strength which is greater than the strength of said upper and lower ends, and said intermediate portion being comprised of elongated thin wood flakes intermixed with a binder and compressed to form a densified product, said upper and lower post portions and said intermediate post portion being formed at the same time and by forming a loosely felted mat comprised of said elongated planar wood flakes intermixed with a binder, said mat including portions intended to form said upper and lower post portions and said mat including an intermediate portion intended to form said intermediate post portion and by compressing said composite wood material mat in a press to form said upper and lower post ends and said intermediate post portions.

24. A post as set forth in claim 23 wherein said elongated wood flakes forming said densified intermediate portion each have a longitudinal axis, and the grain direction of said wood flakes is aligned substantially parallel with the longitudinal axis of said wood flakes, and wherein said wood flakes are aligned with their longitudinal axes parallel to the longitudinal axis of the guard rail post.

25. A post as set forth in claim 23 wherein said wood flakes have an average length of about 0.5 inches to about 3.5 inches, an average width of about 0.1 to 0.5 inches, and an average thickness of about 0.01 to about 0.05 inches.

26. A post as set forth in claim 23 wherein said binder comprises an organic polyisocyanate having at least two active icocyanate groups per molecule.

27. A method for forming an elongated solid structural member including a first structural member portion having a first density and a second structural member portion integrally joined to the first structural member portion and wherein the second structural member portion has a density greater than that of the first structural member portion, the method comprising the steps of

- providing elongated wood flakes having a grain direction extending generally parallel to the longitudinal axis thereof,
- admixing a binder with the wood flakes,
- forming a first mat of the resulting mixture with at least a majority of the wood flakes oriented such that the longitudinal axis thereof is parallel to the axis of the structural member to be formed from the mat,
- forming a second mat portion by depositing additional quantities of said resulting mixture on at least portions of said first mat with at least a majority of the wood flakes in said additional quantity being oriented such that the longitudinal axis thereof is parallel to the axis of the structural member to be formed, and
- compressing said first and second mat portions in a press applying sufficient pressure on the mat to bond the wood flakes together to form a densified integral compressed product.

28. A method according to claim 27 wherein the wood flakes in said first mat are comprised of softwood and wherein the second mat portion is comprised of hardwood flakes.

29. A method according to claim 27 wherein the wood flakes have an average length of about 0.5 inch to about 3.5 inches, an average length to average width ratio of about 4:1 to about 10:1 and an average thickness of about 0.01 to about 0.05 inch.

30. A method according to claim 29 wherein the wood flakes have an average thickness of about 0.015 to about 0.025 inch and an average length of about 1 to 2 inches.

31. A method according to claim 29 wherein the average width of the wood flakes is about 0.1 to about 0.5 inch.

32. A method according to claim 27 wherein the amount of binder admixed with the wood flakes is about 5 to about 12 weight %, as solids based on the dry weight of the wood flakes.

33. A method according to claim 32 wherein the binder includes an organic polyisocyanate having at least two active isocyanate groups per molecule.

34. A method for forming a railroad crosstie including a base portion having a first density and a the supporting portion integrally joined to the base portion and supported by the base portion, and the tie supporting portion having a density greater than that of the portion, the method comprising the steps of

- providing elongated wood flakes having a grain direction extending generally parallel to the longitudinal axis thereof,
- admixing a binder with the wood flakes,
- forming a first mat of the resulting mixture with at least a majority of the wood flakes oriented such that the longitudinal axis thereof is parallel to the axis of the structural member to be formed from the mat,
- forming a second mat portion by depositing additional quantities of said resulting mixture on at least portions of said first layered mat with at least a majority of the wood flakes in said additional quantity being oriented such that the longitudinal axis thereof is parallel to the axis of the structural member to be formed,
- compressing said first and second mat portions in a press applying sufficient pressure on the mat to bond the wood flakes together to form a densified integral compressed product.

35. A method for forming a highway guard post including a lower end adapted to extend into the ground and upper end, said lower and upper ends being comprised of composite wood material having a first density and a densified post portion intermediate said upper and lower ends and integrally joined to the upper and lower ends, the method comprising the steps of

- providing elongated wood flakes having a grain direction extending generally parallel to the longitudinal axis thereof,
- admixing a binder with the wood flakes,
- forming a first mat of the resulting mixture with at least a majority of the wood flakes oriented such that the longitudinal axis thereof is parallel to the axis of the structural member to be formed from the mat forming a second mat portion by depositing additional quantities of said resulting mixture on at least portions of said first mat with at least a majority of the wood flakes in said additional quantity being oriented such that the longitudinal axis thereof is parallel to the axis of the structural member to be formed compressing said first and second mat portions in a press applying sufficient pressure on the mat to bond the wood flakes together to form a densified integral compressed product.

* * * * *

UNITED STATES PATENT AND TRADEMARK OFFICE

CERTIFICATE OF CORRECTION

PATENT NO. : 4,355,754

DATED : October 26, 1982

INVENTOR(S) : Anders E. Lund et al.

It is certified that error appears in the above—identified patent and that said Letters Patent is hereby corrected as shown below:

On the title page:

Inventors should read:

Anders E. Lund, Houghton; Gordon P. Krueger, Hancock; Roy D. Adams, Houghton, all of Mich.

Column 11, Claim 26, line 46, "icocyanate" should be -- isocyanate --; and

Column 12, Claim 34, line 31, "the" should be deleted.

Signed and Sealed this

*Nineteenth* Day of *April 1983*

[SEAL]

*Attest:*

GERALD J. MOSSINGHOFF

*Attesting Officer* *Commissioner of Patents and Trademarks*